July 3, 1951 J. D. THOMPSON 2,559,178
SELF-EMPTYING ASH TRAY FOR MOTOR VEHICLES
Filed Nov. 4, 1949
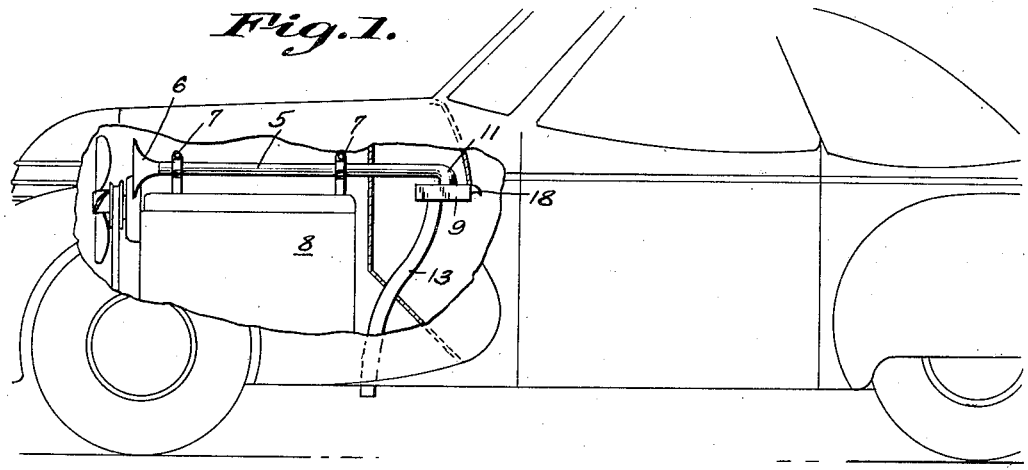
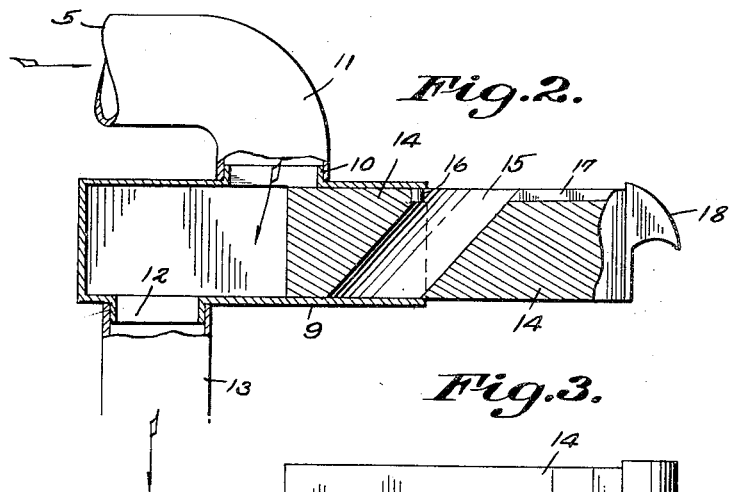
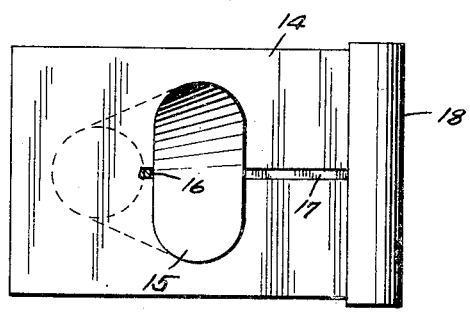
J. D. Thompson
INVENTOR
BY CA Snow & Co.
ATTORNEYS.

UNITED STATES PATENT OFFICE 2,559,178

SELF-EMPTYING ASH TRAY FOR MOTOR VEHICLES

James D. Thompson, West Medford, Mass.

Application November 4, 1949, Serial No. 125,546

2 Claims. (Cl. 206—19.5)

This invention relates to an ash tray especially designed for use in connection with motor vehicles, the primary object of the invention being to provide an ash tray which may be conveniently moved to a position where ashes from a cigar or cigarette may be deposited therein, the ash tray being so constructed and arranged that the air entering under the hood of the motor vehicle, will pass through the ash receiver to clear the ashes or other foreign material therefrom.

An important object of the invention is to provide a device of this character which may be readily and easily mounted on a motor vehicle out of the way, without the necessity of making alterations in the engine or motor vehicle construction to mount the device.

A further object of the invention is to provide a device of this character which may be sold as an accessory at an exceptionally low cost, due consideration having been given to the construction to insure durability of the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1 is an elevational view of a motor vehicle, a portion of the vehicle having been broken away illustrating the device as positioned thereon.

Fig. 2 is an enlarged sectional detail view illustrating the ash receiver.

Fig. 3 is a plan view of the slide into which the ashes and foreign material may be deposited.

Referring to the drawing in detail, the device comprises a main supporting tube 5 which is provided with a funnel-shaped outer end 6 which is so constructed that the air entering the space under the hood of an engine, will be directed rearwardly through the tube 5.

Clamps 7 are secured to the engine block 8 by means of the usual cylinder bolts, whereby the main supporting tube is securely held in position.

The ash tray or receiver includes a box-like housing 9 which is formed with an opening surrounded by the collar 10 over which the curved end 11 of the main supporting tube 5 is positioned and held.

It will be noted that the opening surrounded by the collar 10, is arranged near the center of the housing. In the lower surface of the housing 9, is an opening which is surrounded by the collar 12 over which the upper end of the discharge pipe 13 is positioned. This discharge pipe 13 is of a length to extend an appreciable distance from the housing 9, so that the discharge end thereof will lie below the chassis of the vehicle, so the contents of the pipe 13 may pass therefrom and be delivered at a point below the vehicle.

The reference character 14 indicates the slidable tray which is of a construction to closely fit within the box-like housing 9, in such a way that it will not rattle, due to vibrations of the vehicle.

Formed within the slidable tray 14, is an inclined opening 15 which opening is so constructed that when the tray 14 is moved inwardly to the limit of its inward movement, the upper end of the opening 15 will align with the curved end 11 of the pipe 5, while the lower end of the opening 15 will align with the discharge pipe 13, with the result that ashes deposited in the opening 15, will be blown therefrom and directed exteriorly of the vehicle, through the pipe 13.

Depending from the top of the box-like housing, is a stop pin 16, which pin moves through the groove 17 formed in the upper surface of the sliding tray 14. When the tray moves to the limit of its outward movement, the pin 16 engages one end of the groove 17 preventing complete withdrawal of the tray from the housing.

At the forward end of the tray is the finger piece 18 which may be gripped by the operator in order to move the tray to the position as shown by Fig. 2 of the drawing, wherein the ashes may be deposited in the opening 15.

As shown by Fig. 1 of the drawing, it is contemplated to support the device in such position that it will be concealed by the usual instrument board of the vehicle, and is only visible when it is slid outwardly to its receiving position. When the tray is returned to its normal supporting position, the tray will be invisible, except for the finger piece 18, and the opening will be so aligned with the pipe 13 and tube 5, that air blown therethrough, will remove the ashes from the tray so that it is unnecessary for the operator of the vehicle to clean or remove the ash tray.

Having thus described the invention, what is claimed is:

1. In an ash tray, a housing, an air inlet pipe connected with the housing through which a blast of air is directed to the housing, said housing having an outlet opening offset with respect to the air inlet pipe through which air passes from the housing, a tray slidably mounted within the housing, said tray having an opening extending diagonally therethrough, said opening of the tray forming a receiving compartment into which ashes are deposited, when the tray is extended beyond the front end of the housing, exposing the opening of the tray, said tray being movable into the housing, the ends of the openings of the tray communicating with the openings of the housing whereby a blast of air directed through the openings blows the ashes from the tray.

2. In an ash tray for use on a motor vehicle having a fan operating at the front end thereof, a housing, an air inlet pipe connected with the housing, a funnel-shaped member mounted on one end of the pipe disposed adjacent to the fan, said funnel-shaped member adapted to scoop up air and direct the air to the pipe and housing, said housing having an outlet opening in the bottom thereof through which air passes from the housing, a tray slidably mounted within the housing, said tray having an opening extending diagonally with respect to the upper and lower surfaces thereof, said opening providing a receiving compartment, the upper end of the opening being exposed to receive material when the tray is moved to the limit of its outward movement, said opening of the tray aligning with the air inlet and outlet openings of the housing when the tray moves to the limit of its inward movement, whereby air is directed to the opening of the tray blowing ashes therefrom.

JAMES D. THOMPSON.

REFERENCES CITED

The following references are of record in the file of this patent:

UNITED STATES PATENTS

| Number | Name | Date |
|---|---|---|
| 930,496 | Schmidt | Aug. 10, 1909 |
| 2,323,221 | Hockey et al. | June 29, 1943 |
| 2,461,815 | Gill | Feb. 15, 1949 |